United States Patent [19]

Salihi

[11] Patent Number: 4,501,343
[45] Date of Patent: Feb. 26, 1985

[54] ELEVATOR CAR LOAD AND POSITION DYNAMIC GAIN COMPENSATION

[75] Inventor: Jalal T. Salihi, Manchester, Conn.

[73] Assignee: Otis Elevator Company, Farmington, Conn.

[21] Appl. No.: 434,013

[22] Filed: Oct. 12, 1982

[51] Int. Cl.³ .............................................. B66B 1/30
[52] U.S. Cl. .................................. 187/29 R; 318/803
[58] Field of Search .................. 187/29; 318/801–803

[56] References Cited

U.S. PATENT DOCUMENTS

| 4,319,665 | 3/1982 | Komuro et al. | 187/29 |
| 4,327,315 | 4/1982 | Kawada et al. | 318/803 X |
| 4,376,471 | 3/1983 | Uchino et al. | 187/29 |

Primary Examiner—William M. Shoop
Assistant Examiner—W. E. Duncanson, Jr.
Attorney, Agent, or Firm—Robert E. Greenstein

[57] ABSTRACT

A polyphase induction motor propels an elevator car. The motor is powered by a multiphase inverter which receives power from a battery. The inverter is controlled in such a way as to control the frequency and amplitude of the power supplied to the motor in order to control the motor's speed, acceleration, and slip. That inverter control is accomplished by sensing the motor's speed and in response providing predetermined slip and torque signals. The slip can be controlled over a range which can provide negative slip, by which power is regenerated into the battery, which is thereby charged, and positive slip for motoring torque. A charger also charges the battery. The motor and its controls are thereby ostensibly isolated from the power system that supplies power to the charger, the battery handling the peak power requirements. Loop gain is adjustable in relation to cab loading, and offsets are applied within the loop to adjust the production of the slip and torque signal to reflect cab load and to modify car motion as the car is slowed when approaching the floor for a stop.

8 Claims, 5 Drawing Figures

ELEVATOR CAR LOAD AND POSITION DYNAMIC GAIN COMPENSATION

DESCRIPTION

1. Technical Field

This invention relates to elevators, in particular, loop gain compensation in elevators.

2. Background Art

It is well known that the speed and torque of a polyphase induction motor is a function of the frequency of the alternating power that is supplied to the motor and the voltage that is applied to the windings.

It is also well known that the motor can operate at either a synchronous speed, the same frequency as the power to it, and an asynchronous speed, higher or lower than that frequency. It operates at the synchronous speed when the motor is under no load and at the asynchronous speed when the motor is under load or being driven. The speed difference is known as slip, the magnitude of which dramatically impacts the motor's efficiency and performance.

Therefore, the typical polyphase motor is given requirements for maximum slip by the manufacturer, typically about ± Hz., depending on the motor design and whether it is motoring or regenerating, or braking. To develop maximum torque and maximize motor efficiency, the slip under load conditions should be held at that figure. For instance, if a two-pole motor is powered from a 60 Hz. source during motoring, the speed of rated torque would be about 3540 r.p.m., that being a positive slip of +1 Hz.

Following a converse concept, but using the same criteria, if the motor is moving at a speed which is greater than the frequency, power can be supplied from it or regenerated back to the source. The slip also should be maintained within those limits in this case. But, for regeneration or braking, the speed of the motor may be, for instance, 3660 at rated torque, in which the slip is −1 Hz., this being negative slip.

So, it is not surprising that many techniques have been tried to control slip precisely; however, most have met with less than desirable results because they are too costly, too complicated or do not provide good performance.

In an elevator slip control it is particularly important and demanding because motor performance there must be superior to that in most other applications. For instance, for a comfortable ride the motor must be accelerated and decelerated smoothly, without vibration and noise; yet, for system speed it must be fast. It should also be efficient, which means it should regenerate power, and, naturally, it must be operated in such a way as to provide precise car positioning at the floors. Most important, the motor must often be operated at near zero speed, at which precise frequency control is critically important for smooth performance.

DISCLOSURE OF INVENTION

An object of the present invention is to control loop gain in an elevator system as a function of car load and car position.

According to one aspect of the present invention, a polyphase motor is powered by an inverter that is powered by a D.C. power source, such as a battery that is charged by a battery charger. The inverter is controlled in such a way that the motor slip is controlled to achieve maximum torque and also maximum regeneration to charge the battery. The inverter's output frequency and magnitude are also controlled to control the motor's speed and torque.

According to another aspect of the invention, the inverter may be controlled by a device that provides signals that represent a computed motor speed and slip. Using these signals, the inverter is driven so as to follow a sine curve pattern that is at the desired frequency for the computed slip and at a desired magnitude to achieve desired motor operation with that slip. These signals are digitally produced by sensing the motor shaft position and constantly accumulating count and augmenting that count in proportion to the desired slip. The accumulated count occurs in some particular period of time that corresponds to one-quarter of the period of that sine curve. Taking into account the characteristic interrelationship between the various phases of the signals that are to be supplied to the motor, the relative instantaneous Y-value on the sine curve signal at each phase is produced from that count. The Y-value is adjusted up and down to reflect the instantaneous levels for each phase that drives the inverter. This yields a signal which is supplied to each phase input on the inverter by a switching arrangement. The magnitude of that signal is scaled up or down to control motor current or voltage. Hence, starting with a simple count that represents motor speed and shaft position and adding some numbers to that, a multiphase drive is provided to the inverter to control motor speed, slip and torque.

According to the invention, to generate the signals that power the inverter, the actual motor speed is compared with a dictated motor speed to provide a basic torque signal which then is processed to provide a second torque signal that is subsequently employed to control the inverter.

One aspect of the processing is to adjust the loop gain in relation to the cab load. If the load is less than a certain load, the gain is decreased, which has the effect of decreasing the loop gain in the system. Conversely, if the load is greater, the gain is increased.

Another aspect is to increase the second torque control signal as a function of cab load.

Another aspect of the processing is to increase the second torque control signal as the car begins to slow down near the floor.

Still another aspect is to limit the dictated speed signal as the car doors begin to open as the car approaches the floor.

A feature of the invention is that the motor control is universal; it can be used on all multiphase motors, by augmenting the motor speed count with different pole configurations, and, being that it is not inherently frequency limited, it can control a motor over very wide speed ranges, especially at near zero and low speed, hence making it very attractive for elevators. At the same time, by providing for very precise slip control, the invention optimizes regeneration of power back into the battery, and that is a feature which is particularly useful in an elevator system where regeneration occurs about 30% of the time because the load is counterweighted.

Other objects, benefits and features of the invention will become apparent to one skilled in the art from the description that follows.

BEST MODE FOR CARRYING OUT THE INVENTION

Figure 1:
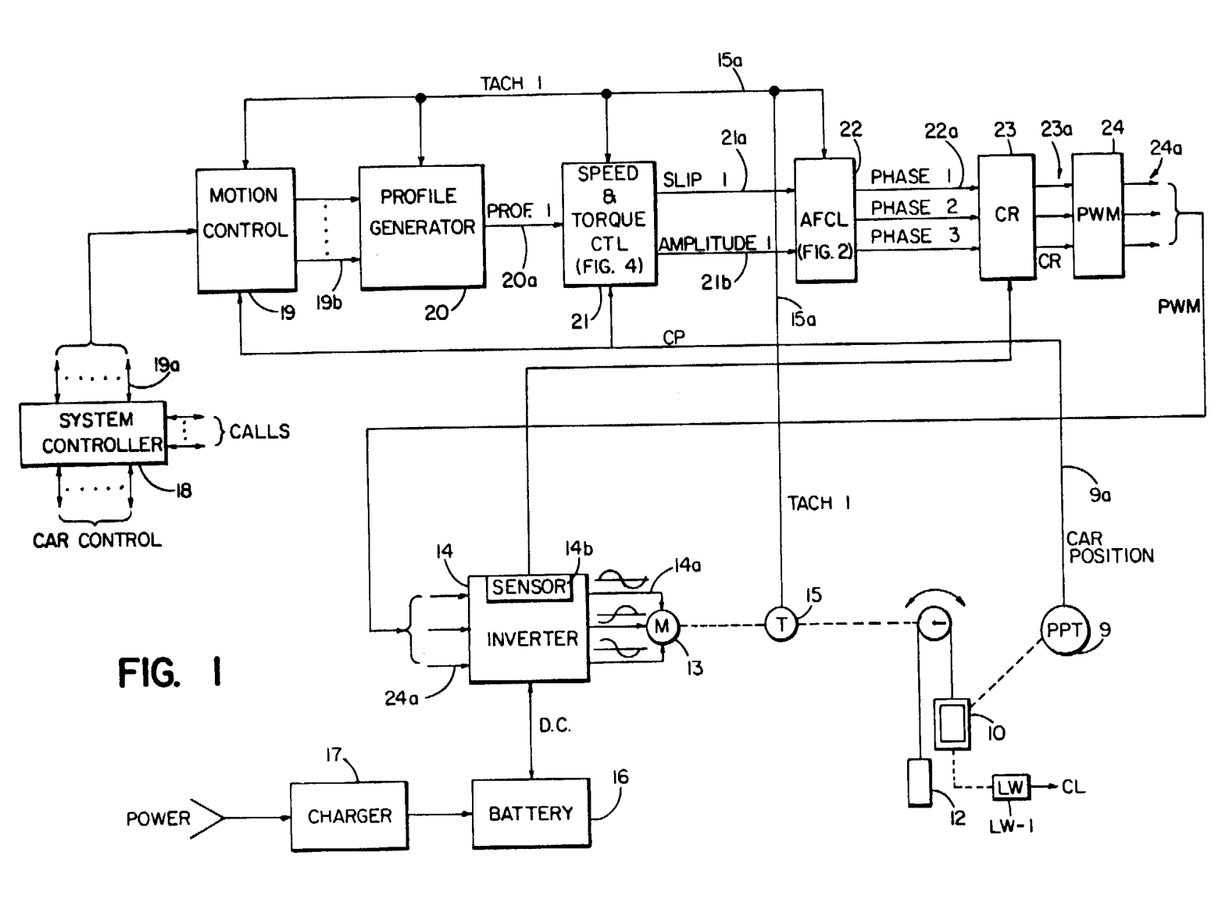
FIG. 1 is a block diagram of an elevator system which embodies the present invention, that system utilizing an inverter to drive a 3-phase motor, and that inverter being powered by a battery and controlled in accordance with the present invention.

FIG. 1 shows an elevator control system which includes a number of functional components that are well known and whose design is not critical to the invention. Hence, those components are not described in detail, except to the extent that is needed to describe the invention. These components include a motion controller, profile generator and speed and torque controller, and others identified in what follows.

In FIG. 1 an elevator car 10 is connected by a cable 11 to a counterweight 12. The car is connected to the phase induction motor 13 which receives 3-phase power from an inverter 14. The motor drives a tachometer 15 (shaft encoder) which produces a tachometer output, TACH 1 signal, on the line 15a that signal reflecting the instantaneous speed of the motor. The inverter receives DC power from a battery 16, and the battery is charged by a charger 17 which is connected to a power source. The DC power may flow to and from the battery through the inverter. Power may flow to the battery by regeneration from the motor as a result of the motion of the car in one direction (e.g. down), and that, in addition to the charger, charges the battery. The battery provides most of the surge or peak power to the inverter, meaning that the system is virtually isolated from the power source, which eliminates one source of RFI and other electrical noises that can build up in the power system and disturb other equipment connected to it.

A system controller 18 receives car controls and calls, and in response communicates with a motion controller 19 over a plurality of lines 19a. The motion controller sends signals from lines 19b to a profile generator 20 which, in a predetermined or programmed manner, establishes a particular motion or velocity profile for the elevator car to move in response to the motion control, this concept being shown in numerous patents. The profile generator provides an output, PROF 1 signal, on line 20a which is supplied to a speed and torque control 21. This speed and torque control unit provides, in response to the PROF 1 signal, a first DC signal, SLIP 1 signal, on line 21a, the SLIP 1 signal reflecting a desired slip for the particular PROF 1 signal generated by the profile generator. The profile generator also provides, on line 21b, a second DC output, AMPLITUDE 1 signal, which represents the desired amplitude of current (or voltage) to the motor winding to move the car as desired.

The interrelationship between the SLIP 1 and AMPLITUDE 1 signals determine the torque and speed of the motor, and the interrelationship is established through feedback control, that control centering on sensing the TACH 1 signal, supplied from the tachometer, and supplying it to the motion controller, the profile generator, the speed and torque controller, which use it to generate their respective signals, and the SLIP 1 and AMPLITUDE 1 signals to obtain a desired motor performance characteristic at any instant to control the car motion as required.

The TACH 1 signal is also supplied to an amplitude and frequency control circuit (AFCL) 22 which also receives the SLIP 1 and AMPLITUDE 1 signal. The AFCL circuit uses those signals to generate PHASE 1, 2, 3 signals over the three output lines 22a, each of those signals comprising a staircase sine wave of high resolution, whose magnitude is varied in a selected relation to the AMPLITUDE 1 signal in order to control the car motion in a certain manner. The signals (PHASE 1-3) are phased apart as required by the phase of the motor (e.g. 0, 120, 240, for a 3-phase motor, the example shows), and their frequency reflects the desired motor speed and slip for a selected SLIP 1 signal. Their magnitude reflects desired motor current, that being controlled by the AMPLITUDE 1 signal.

These PHASE 1-3 signals that comprise the AFCL output are supplied to a current regulator (CR) 23, which then produces output CR signals, also sine waves, on its output lines 23a, these signals being provided to a pulse width modulator (PWM) 24. The PWM supplies corresponding output signals, PWM signals, each signal comprising a pulse whose duration varies in proportion to the magnitude of its corresponding CR signal. The PWM signals are supplied to the inverter on line 24a. The current regulator provides closed loop control of the motor current to ensure that it accurately tracks the PHASE 1-3 signals. This type of control is well known in the field.

The PWM signals that are supplied from the PWM to the inverter turn separate sections or portions of the inverter on and off in direct proportion to the duration of the pulses in the PWM signal. The inverter turns the battery voltage on and off in proportion to the duration of the pulses that comprise the PWM signals, that voltage being applied on the lines 14a to the motor windings. Because the duration of those pulses that drive the inverter are interrelated in a sinusoidal fashion by the AFCL circuit, the average values of the pulses on the inverter output are sinusoidal also. But, even though the output signal on each of the lines 14a from the inverter comprises voltage pulses, the inductive characteristics of the motor result in a sinusoidal current (I) through the motor over each of the lines 14a, the frequency of that current being the primary frequency of the PHASE 1, 2, 3 signals. The harmonics are dramatically suppressed due to the motor's inductance, and, hence, the inverter provides, in effect, sinusoidal 3-phase current to the motor, that current being in response to digital pulses that reflect the current's frequency, magnitude and the phase relationship among the motor's windings. This current I is adjustable in its frequency and its magnitude, through which the motor speed, torque and slip are controlled. This adjustment is accomplished through the AFCL circuit 22, the detailed description of which follows.

Figure 2:
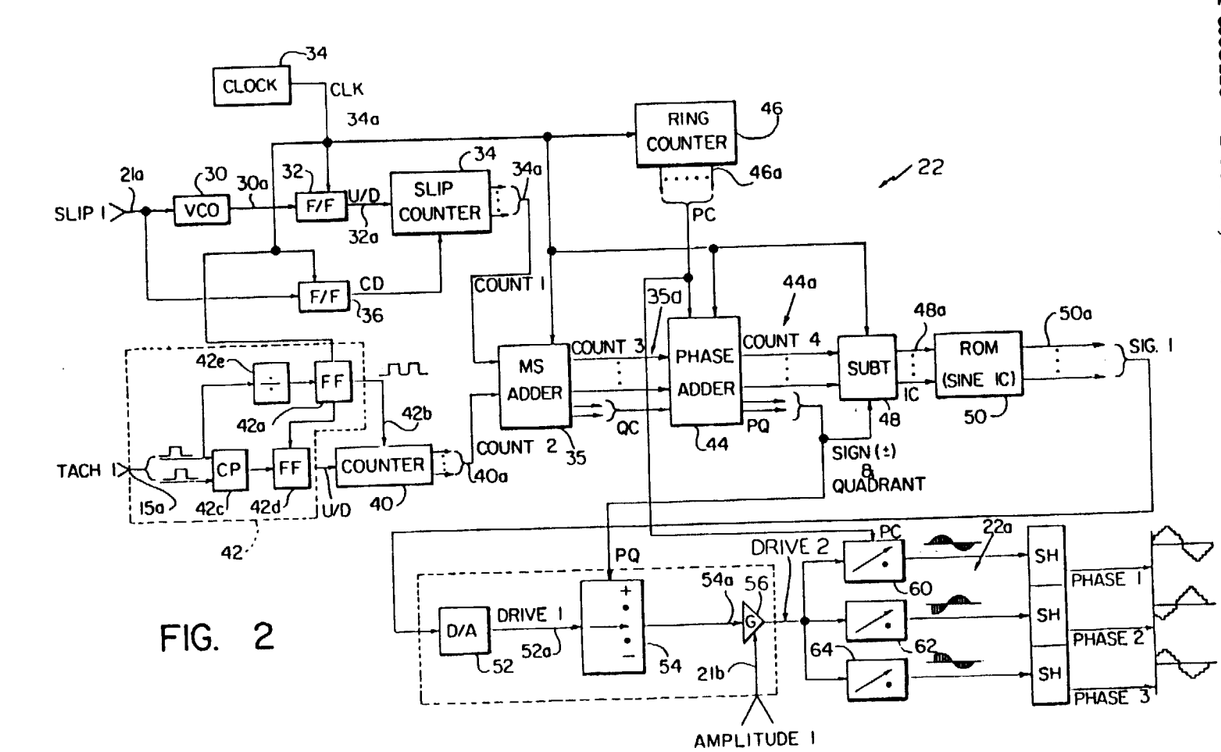
FIG. 2 is a block diagram of an amplitude and frequency control (AFCL) that is used in the system in FIG. 1 to drive the inverter to obtain slip, torque and speed control.

FIG. 2 shows the AFCL circuit 22. The AFCL circuit receives the SLIP 1 signal and also the AMPLI- TUDE 1 signal. The SLIP 1 signal is applied to a voltage controlled oscillator (VCO) 30 which produces an output VCO signal, on line 30a. The VCO signal, which is supplied to a flip-flop 32, consists of a string of pulses whose frequency (VCO frequency) F1 varies in proportion to the DC level of the SLIP 1 signal, which can be adjusted between predetermined positive and negative values, those levels defining a motor speed range, over which the frequency of the VCO may vary to control motor slip.

The flip-flop 32 also receives a CLK output signal from a clock 34; that signal strobes the signal from the VCO to the flip-flop output, producing a flip-flop output signal, also a string of pulses at F1, which are supplied over line 32a to a SLIP counter 33; it counts those pulses. The SLIP counter continually counts up, and on reaching its maximum count (e.g. N bits) starts over. So, its output is actually a signal, COUNT 1, reflecting the count at any instant.

Figure 3:
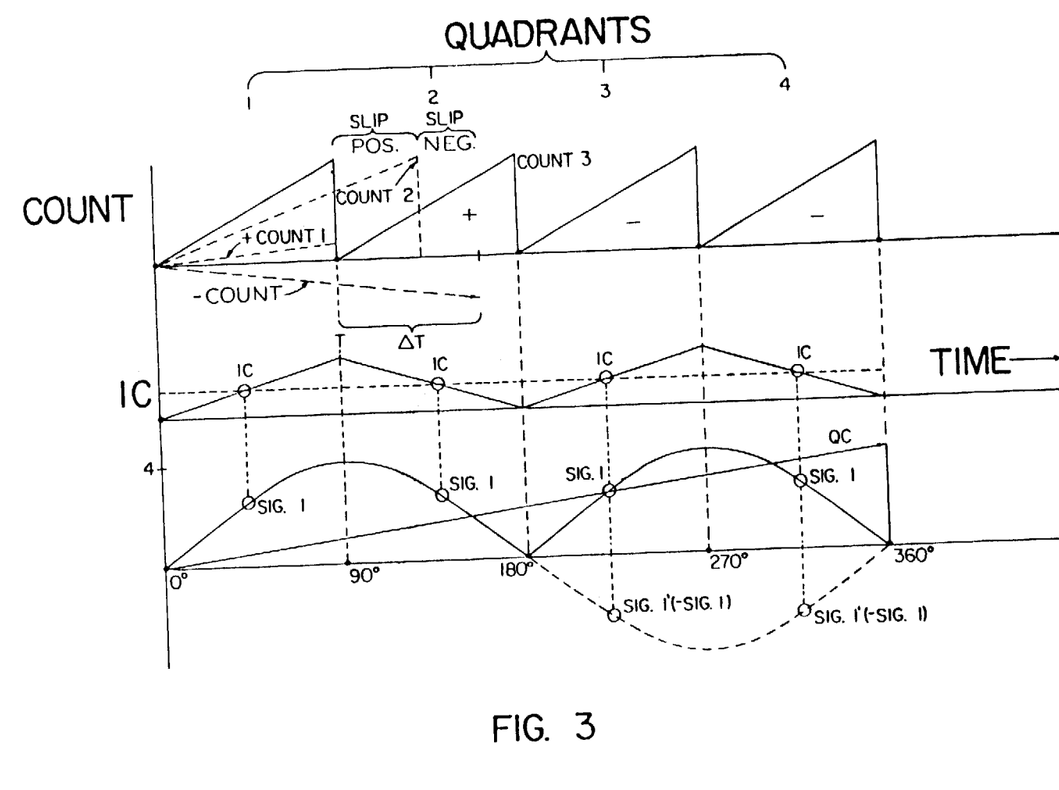
FIG. 3 consists of several waveforms that are in a common time base.

FIG. 3 shows this type of recurring count over time, the Y coordinate there representing the digital output or COUNT 1, the X-coordinate time.

The SLIP 1 signal is also supplied to a second flip-flop 36. Also strobed by the CLK signal, this flip-flop is responsive to the polarity of the SLIP 1 signal, changing state from high to low depending on that polarity in order to provide a count direction signal, CD signal, that commands the SLIP counter to count up or to count down. COUNT 1, from the SLIP counter, is supplied on lines 34a to a motor speed (MS) adder 38, which also receives the output from another counter, speed (SPEED) counter 40, over the lines 40a.

The SPEED counter receives the output from a circuit 42 which includes a flip-flop 42A. This flip-flop 42A provides on its output lines 42B a train of square wave pulses. These are provided in response to the output from a divider circuit 42E which receives the TACH signal that is supplied on the line 15a. That line actually comprises two lines, each of which provide a square wave pulse relative to each other, the pulses on these lines being in quadrature (90° apart).

The divider circuit 42E receives the square wave pulses on one of these lines and provides, as its output, trigger pulses which are at a repetition rate that is equal to or lower than the repetition rate of the square wave pulses provided to its input. The output from the flip-flop 42 is provided to the input of the SPEED counter 40.

Both of the signals that comprise the TACH signal are also supplied to a comparator circuit 42C, and this circuit produces, in response, an output signal, which, depending upon the relationship between those two pulses (i.e. which one leads, which one lags), represents the direction in which the motor is turning. The output from the comparator 42C is then supplied to a flip-flop 42D, which, in response, produces an output signal which is either high or low. This signal is supplied to the count control terminal on the counter 40 to command it to count up or count down the pulses from the flip-flop 42A, depending on whether the signal is high or low. Just like the SLIP counter, the SPEED counter also continuously counts up, resets, and then counts up again. It can also count down depending on the output from the flip-flop 42D. The result is an output signal, COUNT 2, from the counter 40. This signal is also shown in FIG. 2. The repetition rate for COUNT 2 is F2, which is in proportion to the motor speed, since they are generated from the motor's rotation. The pulses that comprise the TACH 1 signal are generated very rapidly during each rotation of the motor, the effect of this being that the rotational position is resolved very precisely. The purpose for the divider then becomes correlating that count to the driving frequency of the motor, which is necessary in order to take into account the number of poles in the motor, since the number of poles determines the speed of the motor. This correlation is important because the repetition rate F2 should correspond to the driving frequency. For example, comparing a four-pole and two-pole motor, the shaft position in the four-pole motor must be resolved so that the COUNT 2 is produced more rapidly per revolution. Hence, the TACH signal must be divided by two for a two-pole motor, otherwise F2 would be too high—the motor would not be synchronized within the slip range. (This assumes that the same tachometer is used, further, the count/revolution would be the same regardless of motor speed.) The reason for this will become even more apparent from the remaining portions of this description, which will show that from the basic frequency F2, a higher or lower frequency is established from the COUNT 1 signal in order to vary the driving frequency from that of the actual motor speed, this being done in order to control slip.

The MS adder adds COUNT 1 and COUNT 2, producing at its output lines 35a, an output COUNT 3 which is the sum of the two. The effect of adding COUNT 1 and COUNT 2 is to shorten the time it takes to obtain a particular COUNT 3, and thus shorten T in FIG. 3. In other words, as the SLIP counter counts up, the slope of waveform A will increase because T becomes less. As it counts slower, the slope will be less because T will increase. So, by changing the VCO frequency, T can be increased and decreased in proportion to COUNT 1, that range being the SLIP RANGE or $\Delta t$, that defining a change in frequency between F1, the frequency of COUNT 1, and F2, the frequency of COUNT 2.

As explained later in detail, to maintain a certain slip, COUNT 1 is controlled to be higher or lower than COUNT 2 by an amount that equals the slip that is desired (e.g. specified for the motor). The overall action of the AFCL circuit on the motor's operation is represented by this equation (1).

$$F\ SYNCH = \pm F(MOTOR) \pm F(SLIP) \qquad (1)$$

Here, F SYNCH is also the frequency (F3) of the PHASE 1–3 signals, which is the inverter driving frequency. FM is the motor speed and COUNT 2 is a function of it, but may be ± depending on the direction of rotation, because COUNT 2 can be a down count or up count. F SLIP, the same as the VCO frequency, may be ± depending on the SLIP signal, which may be ± to effect ± slip. Thus, a smooth transition between motor functions is obtained, which is important for leveling at "close speed" (near zero speed).

In addition to COUNT 3, the adder 35 also provides a digital output, QC signal, which is a representation of the number (0–4) of cycles made by the COUNT 2. Each cycle is a quadrant, representing 90° in a full cycle of 360°. To do this, the MS adder output may have N bits, but actually use N-X bits for COUNT 3, and the remainder of the N bits for indicating the quadrant and the sign of the sine curve in that quadrant.

COUNT 3, from the MS adder, is supplied to a second adder, the PHASE adder 44. The PHASE adder 44 also receives, on the lines 46a, a phase identification (PC) signal, from a ring counter 46, that signal being provided in response to the CLK signal. The PC signal identifies, at any instant in time, one of the desired phases, i.e. windings (e.g. 0°, 120°, 240°). This PC is a number which, if added to COUNT 3, would reflect what would be COUNT 3 at that phase; that is, a phase shifted by some amount reflected in the PC signal. In other words, the ring counter continually provides a "circulating digital" number which, when added to COUNT 3, reflects a count for one of the phases. The PC signal is also added with the QC signal in the PHASE adder, producing a PQ signal that represents the right quadrant for the phase for the PC signal, since the quadrant may be different for a different phase. Thus, the output from the PHASE adder 44 includes (1) an instantaneous digital representation, COUNT 4, of the count for a particular point X or counts for one phase, and (2) a digital representation of the quadrant for the PQ signal and its sign.

COUNT 4 represents the coordinate for any point on the SINE curve in FIG. 3, but only between 0°–90°. From the two, the proper point on the SINE curve for that coordinate is generated at any instant. This is done in the AFCL circuit for each phase, each time the PC signal changes, which occurs at the CLK rate.

COUNT 4 and the PQ signal are supplied to a subtractor unit 48, over the lines 44a. In response to the PQ signal, the subtractor provides an output, the IC signal, which is the proper coordinate value for the quadrant indicated in the PQ signal for COUNT 3. The subtractor counts down from the COUNT 4 signal for other quadrants during the presence of a PQ signal identifying that quadrant which, if not present, inactuates the subtractor. Then, it can be seen that the effect of the PC signal is to shift the IC signal between 0°, 120° and 240°.

The IC signal from the subtractor is a coordinate (e.g. X), and it is furnished on lines 48a to a lookup table, ROM 50. That IC signal addresses a particular number in the lookup table, that number corresponding to the sine value for a point on the SINE curve between 0°–90°. The ROM thus produces, on its output lines 50a, a digital output, SIG 1, that is the sine value for the coordinate identified by COUNT 3, but still uncorrected for the polarity for its quadrant. The SIG 1 signal is supplied to a digital to analog (D/A) converter 52 which produces an analog output, DRIVE 1 signal, on line 32a. This DRIVE 1 signal is supplied to a switch circuit 54, which also receives the PQ signal and, depending on what quadrant that identifier identifies, switches the DRIVE 1 signal between a positive or negative value, which gives the DRIVE 1 signal the right polarity for the quadrant. For example, the SIG 1 signal (so also DRIVE 1) would be negative in quadrants 3 and 4, as shown by the broken sine curve containing SIG 1' (SIG 1' being SIG 1 on the true sine curve). Thus a full sine curve is generated through the four quadrants shown over time—as different SIG 1 signals are provided and given the right polarity.

From the switch circuit the DRIVE 1 signal is supplied on line 54a to an amplifier (G) 56, whose gain is controlled in response to the magnitude of the AMPLITUDE 1 signal, in order to produce an output, DRIVE 2, whose magnitude is proportional to the AMPLITUDE 1 signal. This DRIVE 2 output signal is simultaneously supplied to three switches 60, 62, 64, each one corresponding to one phase drive of the inverter, each providing one of the PHASE 1, 2, 3 signals. These three switches receive the PC signal from the ring counter 46, that signal identifying the phase for the DRIVE 2 signal, and, depending on what that signal is, one of these switches is actuated, which transfers the DRIVE 2 signal to correct one of the sample and hold circuits 55, which produces a staircase sine signal over time—as the DRIVE 2 signal is generated. The SH outputs are the PHASE 1, PHASE 2 and PHASE 3 signals.

The PHASE 1, PHASE 2, PHASE 3 signals are thus phased according to the PC signal and are at a common frequency, F SYNCH (see equation 1).

To demonstrate this slip control, this example is provided. Assume a two-pole AC motor at 3600 r.p.m., that is, driven by variable frequency drive using the invention; what are the frequencies of the VCO output (F1) and TACH signals and slip characteristics required for, (Case 1) zero torque; (Case 2) positive driving torque; and (Case 3) negative regeneration or braking using a constant AMPLITUDE 1 signal.

Case 1:
FM = 60 Hz.
F SLIP = 0
F SYNCH = 60 Hz.
VCO frequency = 0
TACH frequency = 1024 pulses/second Case 2:
FM = 60 Hz.
F SLIP = +1 Hz.
F SYNCH = 61 Hz.
VCO frequency = +170
TACH frequency = 1024 pulses/second Case 3:
FM = 60 Hz.
F SLIP = −1 Hz.
F SYNCH = 59 Hz.
VCO frequency = −170
TACH frequency = 1024 pulses/second Hence, with this system the car can be moved from zero to full speed at a controlled rate and with a controllable slip, by controlling the SLIP 1 and AMPLITUDE 1 signals.

Figure 4:
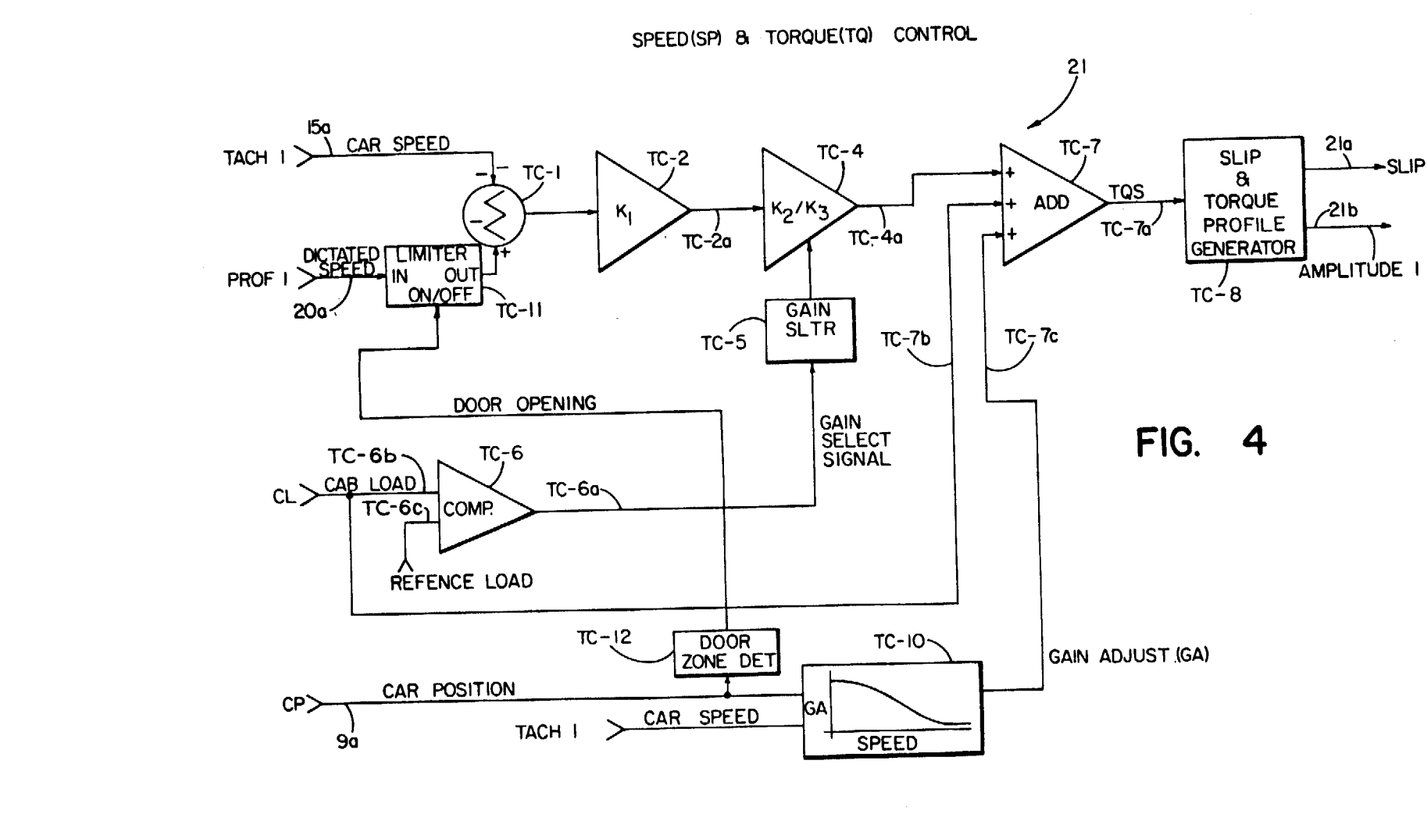
FIG. 4 is a block diagram showing the torque control in FIG. 1.

The speed and torque control 21, shown in FIG. 4, receives the TACH 1 and PROF 1 signals and processes them to provide the SLIP and AMPLITUDE 1 signals which are employed to control the motor's speed and slip. Torque controls for processing a single motor signal in this fashion are very well known. The control 21, however, is quite different, providing additional processing that significantly improves the motor control accuracy.

The TACH 1 and PROF 1 signals, on the lines 15a and 15b, are applied to a summing function TC-1 at the input to an amplifier TC-2 with a gain K1. The amplifier's output (K1X ERROR) is applied on the line TC-2a to another amplifier TC-4, the gain of this amplifier being selectable between two gains K2 or K3. The selection is controlled by a gain selector TC-5, e.g. a switch or gate to switch feedback resistors in and out. The gain selector responds to the output from a comparator TC-6 which produces a gain select signal, on the line TC-6a, which commands one of the gains K2 or K3, depending on gain select signal's level (high or low). That level is determined by the difference between a cab load signal CL, on the line TC-6b, to one comparator input and a reference load signal, on the line TC-6c, to the other input. The cab load signal is provided by a load weighing unit (LW) in FIG. 1. (A variety of such devices is well known and shown in numerous patents.) By operation of the comparator the gain is selected between K2 and K3. Assuming K2 is less than K3, K3 is selected when the cab load increases above some level defined by the reference signal; below that K2 is selected. This minimizes sagging when the brake is lifted just before the car starts to move away from the floor.

The output from the amplifier TC-4 is applied over the line TC-4a to one of three inputs of an adder TC-7. The output from the adder is a single motor torque command signal, the TQS signal, which is applied on the line TC-7a to a slip and speed profile generator TC-8 which produces the SLIP and AMPLITUDE 1 signals. Such profile generators for providing those two signals are well known in the art and thus are not explained herein.

One of the other inputs, on the line TC-7b, is the cab load signal. The effect is that as cab load increases, the TC signal will increase for a constant input on the line TC-4a. This compensates for the greater load—but without increasing the loop gain, which could affect stability negatively.

The third input, on the line TC-7c, to the adder TC-7 is furnished from a function or profile generator TC-10. The function generator's output is a gain adjust signal which is also added to the signal on the line TC-4a, thus increasing the TC signal. The function generator provides the gain adjust signal in response to a car position signal from the primary position transducer (See FIG. 1) and in response to the TACH 1 signal which represents the car speed. The gain adjust signal is a function of those two inputs: As car speed *decreases*, the gain adjust signal *increases;* the gain adjust signal is only provided (gated) to the line TC-7a and beginning at a certain car position, namely after car slowdown begins (see FIG. 5). Thus, as slowdown begins (near a floor), the TC signal is increased as the car slows, and this improves stopping accuracy.

Figure 5:
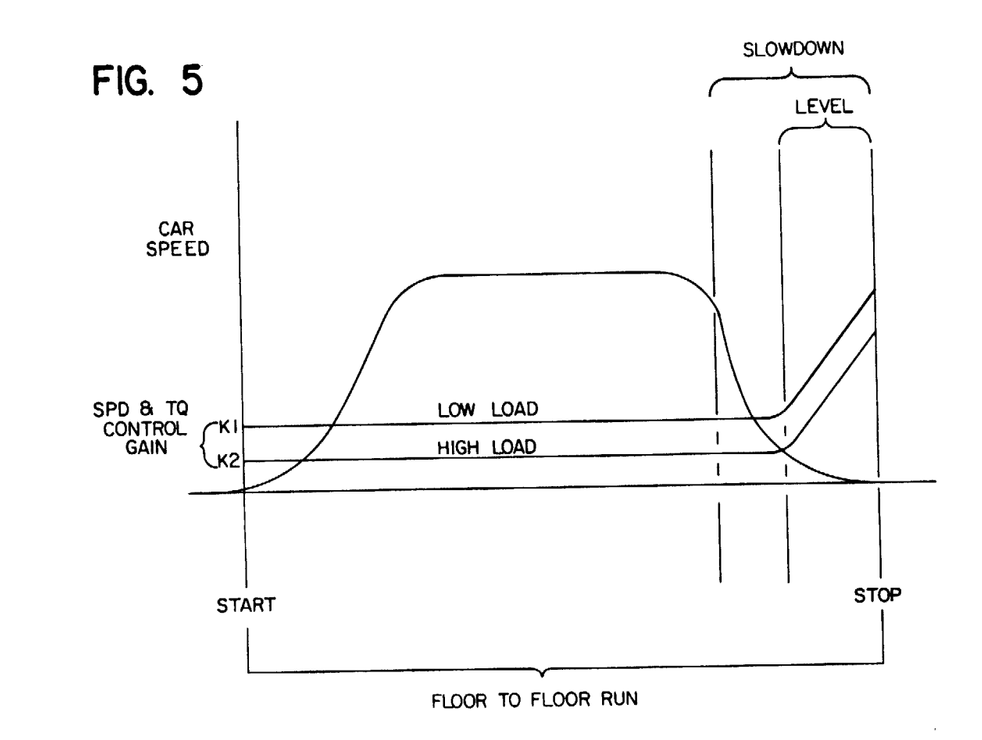
FIG. 5 is a graph showing gain/car position/car speed characteristics of the torque control.

FIG. 5 demonstrates the characteristics of a floor to floor run (start - stop). There it can be seen that just as slowdown starts, the gain adjust signal is zero, so there is no change in the TC signal gain. But, near the level zone—close to the floor—the gain increases due to the gain adjust signal. As a result, there is high torque control gain—hence, high loop gain—as the car stops and levels, which greatly enhances stopping accuracy. FIG. 5 also shows the gain selection that happens at a start, which gives rise to one of two gain curves that are constant until the slowdown range is reached, where the gain adjust signal comes into play. The cab load signal is also constant through a floor to floor (start - stop) run.

The torque control also contains a torque limiter TC-11 which limits the PROF 1 signal to less than a certain level when the car is in the door zone region. The limiter is activated by a door zone detector TC-12 which is responsive to the car position signal for identifying when the car is in the door zone region near the floor, where the doors start to open preparatory to a stop at the car.

Obviously, various operations in this system may be performed with computer-based equipment. Discrete portions have been used in this description for illustrative purposes to demonstrate one way to implement the invention. To one skilled in the art there will be modifications and variations that can be made to the embodiment that has been shown and described without departing from the true scope and spirit of the invention. Some of those variations may include the use of a computer to carry out a number of functions performed in the discrete system comprising the AFCL circuit.

Needless to say, other applications for the invention exist. For example, it can be used to drive a cycloconverter, rather than an inverter, in order to power the motor. That is to say, the AFCL circuit can be used to provide sine related signals to operate the cycloconverter in order to provide AC power to a polyphase motor.

The use of the invention to control a 3-phase motor has been shown and described because it facilitates an understanding of the invention. Even so, it should be apparent to one skilled in the art that it could be used to control other motors, such as a 2-phase motor, simply by using the right phase signal relationship, in order to identify the phase windings and in order to generate the correct coordinate on the sine curve for the winding and establish the correct polarity for it.

Although the invention has been shown for use for controlling the current of the motor, it could be used to control motor voltage. Further, by correlating the amplitude and slip, different motor and slip controls can be obtained, e.g. one signal can dictate motor torque.

Moreover, from the foregoing it will be seen that there are many applications for the invention to control induction motors and that the invention may be carried out in many ways, perhaps through computer utilization for carrying out various computational type functions that are performed by the discrete circuits and units that have been described. This may, in fact, be an economically attractive alternative to using such items as the adders, counters, and flip-flops, which simply provide a convenient, comparatively low cost way to perform certain functions that could be done in a computer, for example, one using a microprocessor.

Other modifications, variations and alterations may be made to the embodiments of the invention that have been described without departing from the true scope and spirit of the invention as described in the claims that follow.

I claim:
1. An elevator comprising:
   a polyphase electric motor, said motor having N phases and corresponding windings, N being two or more;
   a D.C. power source;
   an inverter for providing current or voltage from said source to each stator winding in the motor, said inverter having an input for each winding and a corresponding output;
   a position encoder for providing a signal (TACH) that identifies the motor shaft position;
   an elevator car that is propelled by the motor;
   an elevator control for controlling the operation of the inverter to produce alternating N phase current or voltage for said stator windings to control motor speed (r.p.m.), slip and direction;
   the elevator being characterized in that said control comprises:
   means for providing a signal (AMPLITUDE) in response to the TACH signal to control motor speed (r.p.m.);
   means for providing a signal (SLIP) in response to the TACH signal to control the difference between the motor r.p.m. and the frequency (F SYNCH) of the alternating current or voltage that is supplied to the motor by the inverter;

means responsive to the SLIP signal and TACH signal for providing a signal that repeats at F SYNCH, said signal identifying an angular position on a sine curve, and for providing N second signals, each representing the Y-coordinate on said sine curve at different angular positions thereon, said positions being equally spaced apart by 360°/N, said N second signals being provided in a successive sequence during each motor rotation, the sequence in one motor direction being the reverse of the sequence in the opposite direction;

means for varying the magnitude of each second signal as a function of the AMPLITUDE signal;

means for applying each second signal to a different one of the inverter inputs according to said successive sequence;

means for providing a dictated motor speed signal in response to the TACH signal, said dictated motor speed signal representing a desired motor speed;

means for providing a cab load signal that represents the load in the car; and means for providing a first error signal in response to said dictated motor speed signal and said TACH signal, said error signal representing the difference between the actual motor speed and the desired motor speed, and for providing a second error signal by amplifying said first error signal in relation to said cab load signal so that the magnitude of said first error signal is increased when the motor is about to be started if the cab load is greater than a certain load;

said means for providing said AMPLITUDE signal and means for providing said SLIP signal being responsive to said second error signal.

2. An elevator according to claim 1, characterized in that:

said means for providing said second error signal comprises means for increasing said second error signal by adding thereto a signal that is proportional to the cab load signal.

3. An elevator according to claim 2, characterized in that:

said means for providing said second error signal comprises means for increasing said second error signal, as the car slows down, by adding a signal thereto that increases as car speed decreases.

4. An elevator according to claim 3, characterized in that:

said means for providing said first error signal includes means for limiting its magnitude when the car doors begin to open as the car approaches a floor.

5. An elevator comprising:

a polyphase electric motor, said motor having N phases and corresponding windings;

a D.C. power source;

means for providing current or voltage from said source to each stator winding in the motor;

an encoder for providing a signal (TACH) that identifies the motor shaft position;

an elevator car that is propelled by the motor;

an elevator control for controlling the operation of the means for providing current or voltage to produce alternating N phase current or voltage for said stator windings to control motor speed (r.p.m.), slip and direction;

the elevator being characterized in that said elevator control comprises:

means for providing a signal (AMPLITUDE) in response to the TACH signal to control motor speed (r.p.m.);

means for providing a dictated motor speed signal in response to the TACH signal, said dictated motor speed signal representing a desired motor speed;

means for providing a cab load signal that represents the load in the car; and means for providing a first error signal in response to said dictated motor speed signal and said TACH signal, said error signal representing the difference between the actual motor speed and the desired motor speed, and for providing a second error signal by amplifying said first error signal in relation to said cab load signal, so that the magnitude of said error is increased when the motor is about to be started if the cab load is greater than a certain load.

6. An elevator according to claim 5, characterized in that:

said means for providing said second error signal comprises means for increasing said second error signal by adding thereto a signal that is proportional to the cab load signal.

7. An elevator according to claim 6, characterized in that:

said means for providing said second error signal comprises means for increasing said second error signal, as the car slows down, by adding a signal thereto that increases as car speed decreases.

8. An elevator according to claim 7, characterized in that:

said means for providing said first error signal includes means for limiting its magnitude when the car doors begin to open as the car approaches a floor.

* * * * *